(12) United States Patent
Kikuchi

(10) Patent No.: US 11,962,246 B2
(45) Date of Patent: Apr. 16, 2024

(54) POWER SUPPLY CONTROL DEVICE AND FLYBACK CONVERTER

(71) Applicant: ROHM CO., LTD., Kyoto (JP)

(72) Inventor: Hiroki Kikuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 296 days.

(21) Appl. No.: 17/584,706

(22) Filed: Jan. 26, 2022

(65) Prior Publication Data

US 2022/0255437 A1  Aug. 11, 2022

(30) Foreign Application Priority Data

Feb. 8, 2021  (JP) .................................. 2021-018098

(51) Int. Cl.
- *H02M 3/335* (2006.01)
- *H02M 1/00* (2006.01)
- *H02M 1/32* (2007.01)

(52) U.S. Cl.
CPC ..... *H02M 3/33507* (2013.01); *H02M 1/0009* (2021.05); *H02M 1/32* (2013.01); *H02M 3/33592* (2013.01)

(58) Field of Classification Search
CPC .. H02M 1/0009; H02M 1/32; H02M 3/33507; H02M 3/33592
See application file for complete search history.

(56) References Cited

FOREIGN PATENT DOCUMENTS

| JP | 2003-209971 | 7/2003 | |
| KR | 20130084199 A | * 7/2013 | ......... H05B 33/0824 |

* cited by examiner

*Primary Examiner* — Thienvu V Tran
*Assistant Examiner* — Johana Dumeng-Roman
(74) *Attorney, Agent, or Firm* — Fish & Richardson P.C.

(57) ABSTRACT

The present disclosure provides a power supply control device and a flyback converter. The power supply control device includes: a comparator, comparing a current sensing signal generated by IN conversion of a primary side current flowing in the primary winding with a threshold voltage; a switching controller, turning off a switching element according to a comparing result of the current sensing signal and the threshold voltage by the comparator; an external terminal, connectable to a connection node of an external resistor connected in series between one end of the auxiliary winding and an application end of a ground potential; a current detector, detecting a terminal current flowing through the external terminal; and a threshold voltage corrector, correcting the threshold voltage based on a current detection signal of the current detector.

20 Claims, 10 Drawing Sheets

POWER SUPPLY CONTROL DEVICE AND FLYBACK CONVERTER

TECHNICAL FIELD

The present disclosure relates to a power supply control device for a flyback converter.

BACKGROUND

Conventionally, as a switching power supply circuit applied to an isolated direct-current (DC)/DC converter or an isolated alternating-current (AC)/DC converter, a flyback converter is provided (for example, patent publication 1). A flyback converter chops a DC input voltage by a switching transistor, and transmits energy to a secondary side through a transformer.

PRIOR ART DOCUMENT

Patent Publication

[Patent publication 1] Japan Patent Publication No. 2003-209971

SUMMARY

Problems to be Solved by the Present Disclosure

In a flyback converter, a primary side current flowing through a primary winding of a transformer is compared with a threshold. For example, a primary side current is compared with an overcurrent threshold to detect an overcurrent.

It is an object of the present disclosure to provide a power supply control device that improves current control performance when a current flowing through a primary winding of a transformer is compared with a threshold.

Technical Means for Solving the Problem

A power supply control device used for a flyback converter is provided according to an embodiment of the present disclosure. The flyback converter includes: a switching element; a transformer, including a primary winding, a secondary winding and an auxiliary winding; a rectifying element; and a smoothing capacitor, wherein an application end of an input voltage is connected to one end of the primary winding, a current inflow end of the switching element is connected to another end of the primary winding, and the rectifying element and the smoothing capacitor are disposed on a rear side of the secondary winding, wherein the power supply control device includes: a comparator, comparing a current sensing signal generated by UV conversion of a primary side current flowing in the primary winding with a threshold voltage; a switching controller, turning off the switching element according to a comparing result of the current sensing signal and the threshold voltage by the comparator; an external terminal, connectable to a connection node of an external resistor connected in series between one end of the auxiliary winding and an application end of a ground potential; a current detector, detecting a terminal current flowing through the external terminal; and a threshold voltage corrector, correcting the threshold voltage based on a current detection signal of the current detector (first configuration).

In the first configuration, the current detector is a current detection resistor (second configuration).

In the second configuration, the threshold voltage corrector includes a reverse amplifier that inverts and amplifies the current detection signal (third configuration).

In any of the first to third configurations, the threshold voltage corrector includes a sample hold unit that samples a voltage based on the current detection signal (fourth configuration).

Any of the first to fourth configurations may further include a voltage adjustment resistor connected between an input terminal of the comparator and an application end of a reference voltage, wherein the threshold voltage corrector generates an output current based on the current detection signal, and the output current flows through the voltage adjustment resistor and is sucked into one side of the threshold voltage corrector (fifth configuration).

In the fifth configuration, the threshold voltage corrector includes a constant current generating circuit in which a voltage based on the current detection signal is inputted to generate a constant current, and the output current is generated based on the constant current (sixth configuration).

In the sixth configuration, the threshold voltage corrector includes: a first current mirror, having an input end connected to an output end of the constant current generating circuit, wherein the first current mirror is composed of a PMOS transistor; and a second current mirror, having an input end connected to an output end of the first current mirror, wherein the second current mirror is composed of an NMOS transistor (seventh configuration).

In any of the first to fourth configurations, an input terminal of the comparator is connected to an application end of a reference voltage, and another input terminal of the comparator is connected to an end of a resistor including a sensing resistor having one end connected to a current outflow end of the switching element, the threshold voltage corrector generates an output current based on the current detection signal, and the output current is discharged toward a node to which the another input terminal of the comparator and the end of the resistor are connected (eighth configuration).

The eighth configuration may include an inserting resistor inserted between the another input terminal of the comparator and the end of the resistor including the sensing resistor (ninth configuration).

Any of the first to ninth configurations may further include a switch disposed in a path through which the terminal current flows, and controlled to be on/off based on a signal related to a drive of the switching element (tenth configuration).

In any of the first to tenth configurations, the threshold voltage is an overcurrent protection (OCP) threshold voltage (eleventh configuration).

Any of the first to fourth configurations may further include: a first comparator, comparing a feedback voltage based on an output voltage of the flyback converter with a burst threshold voltage; and a second comparator, used as a comparison unit for comparing the feedback voltage and the current sensing signal, wherein the switching controller switches between halt and resumption of a switching of the switching element according to an output of the first comparator, and the threshold voltage is the burst threshold voltage (twelfth configuration).

A flyback converter according to an embodiment of the present disclosure includes the power supply control device of any of the configurations, the switching element, the transformer, the rectifying element, the smoothing capacitor, and the external resistor.

DETAILED DESCRIPTION OF THE EMBODIMENTS

Details of the exemplary embodiments of the present disclosure are given with the accompanying drawings below.

1. Regarding Issues

Issues discovered single-handedly by the applicant of the present application are first described before describing the embodiments of the present disclosure.

A transformer is disposed in a flyback converter. A transformer includes a primary winding and a secondary winding. A direct-current (DC) voltage, that is, an input voltage VH, is applied to one end of the primary winding. A current inflow end (for example, the drain of an NMOS transistor) of a switching element is connected to the other end of the primary winding.

A current flowing in the primary winding, that is, a primary side current Ip, is IN converted (current/voltage conversion) to become a current sensing signal Vcs. To serve as an overcurrent protection (OCP) function, the current sensing signal Vcs is compared to an OCP threshold voltage Vth_ocp. If the switching element is on, the primary side current Ip rises. When the current sensing signal Vcs rises as the primary side current Ip rises, and exceeds the OCP threshold voltage Vth_ocp, the switching element is turned off.

Figure 1:
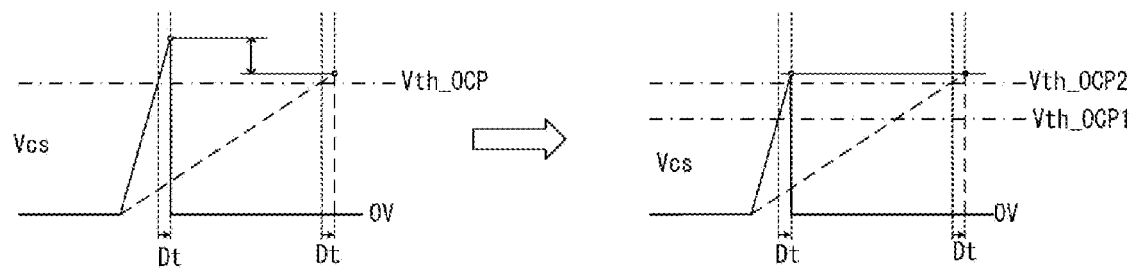
FIG. 1 is a diagram of an exemplary waveform for illustrating a first issue.

The left of FIG. 1 indicates an exemplary waveform of the current sensing signal Vcs when the primary side current Ip rises. On the left of FIG. 1, the solid line indicates a waveform of the current sensing signal Vcs when the input voltage VH is high, and the dotted line represents a waveform of the current sensing signal Vcs when the input voltage VH is low. A rising slope of the current sensing signal Vcs increases as the input voltage VH gets higher.

As shown on the left of FIG. 1, when the input voltage VH is in any value, a delay time Dt is generated from an instant of rising of the current sensing signal Vcs and exceeding the OCP threshold voltage Vth_ocp to an instant of turning off of the switching element. Thus, as shown on the left of FIG. 1, when the OCP threshold voltage Vth_ocp is independent from the input voltage VH and is fixed, the current sensing signal Vcs at the instant of turning off the switching element, that is, a peak value of the primary side current Ip, differs even more because the input voltage VH is different. If the peak value of the primary side current Ip is increased, the number of turns of the primary winding needs to increased so that magnetic saturation does not occur even under a larger primary side current Ip. However, the above leads to the increased size of the transformer and the increased cost.

An example of such change in the input voltage VH occurs when a flyback converter is applied to an isolated AC/DC converter and when a change occurs in the AC voltage (for example, AC 100V, 200V, etc.). In this case, the AC voltage is rectified/smoothed to generate the input voltage VH.

The right of FIG. 1 indicates an exemplary waveform of the current sensing signal Vcs when there is a change in the OCP threshold voltage Vth_ocp according to the input voltage VH. In this case, an OCP threshold voltage Vth_ocp1 with a higher input voltage VH is lower than an OCP threshold voltage Vth_ocp2 with a lower input voltage VH. Thus, as shown on the right of FIG. 1, after the delay time Dt has elapsed from instants at which the current sensing signal Vcs individually exceeds the OCP threshold voltages Vth_ocp1 and Vth_ocp2 to an instant of turning off of the switching element, a difference in the peak value of the current sensing signal Vcs, that is, the primary side current Ip, can be inhibited.

Figure 2:
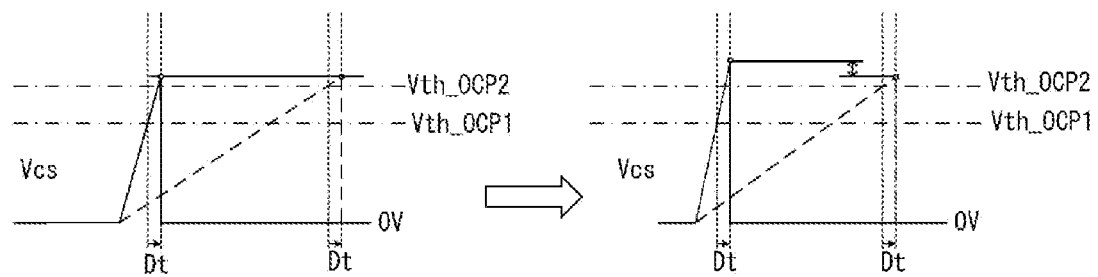
FIG. 2 is a diagram of an exemplary waveform for illustrating a second issue.

However, as described above, when the OCP threshold voltage changes according to the input voltage VH, as shown on the left of FIG. 2 (the same as the right of FIG. 1), although an inductance of the primary winding in a certain value can inhibit the peak difference in the primary side current Ip, a situation shown on the right of FIG. 2 may be resulted when the inductance changes because of the primary winding used. The right of FIG. 2 indicates an example in which the inductance of the primary winding is lower than that on the left of FIG. 2. In this case, as shown on the right of FIG. 2, a rising slope of the current sensing signal Vcs changes (in the example on the right of FIG. 2, the slope steepens), and the peak difference in the primary side current Ip at the instant of turning off of the switching element is increased.

2. Overall Configuration of a Flyback Converter

Figure 3:
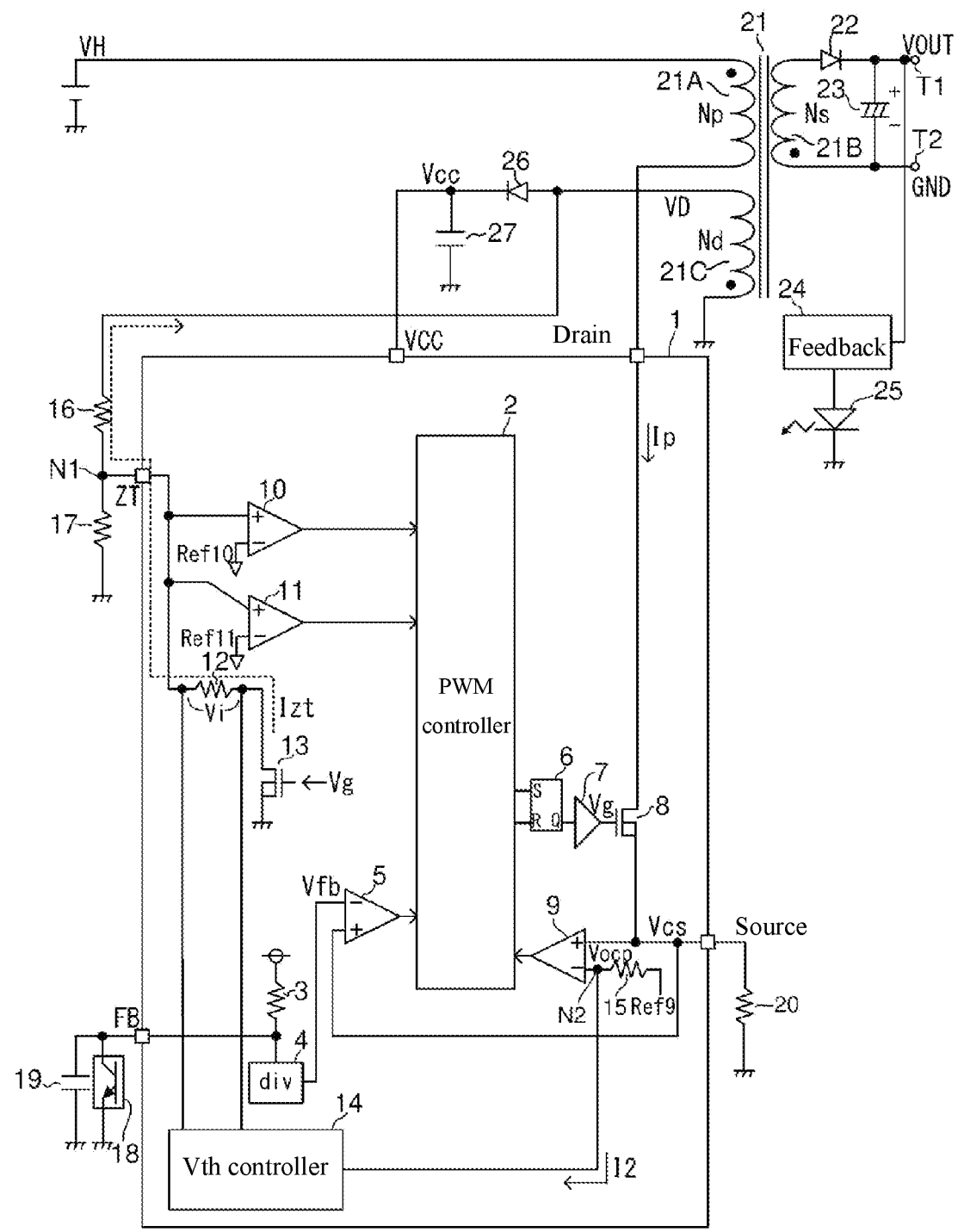
FIG. 3 is a diagram of a configuration of a flyback converter according to an exemplary embodiment of the present disclosure.

Considered embodiments for solving the issues are described below. FIG. 3 shows a diagram of a configuration of a flyback converter 28 according to an exemplary embodiment of the present disclosure. The flyback converter 28 performs DC/DC conversion for converting a DC voltage, that is, the input voltage VH, into a DC voltage, that is, an output voltage VOUT. Preferably, the flyback converter 28 is applied to an isolated AC/DC converter in which there are more instances of changes in the input voltage VH as described above. However, the flyback converter 28 may also be applied to an isolated DC/DC converter in which the input voltage VH changes.

As shown in FIG. 3, the flyback converter 28 includes a power supply control device 1, external resistors 16 and 17, a light receiving element 18, a capacitor 19, a sensing resistor 20, a transformer 21, a rectifying diode 22, a smoothing capacitor 23, a feedback circuit 24, a light emitting element 25, a rectifying diode 26 and a smoothing capacitor 27. The power supply control device 1 is a semiconductor device (semiconductor package) of an integrated circuit (IC) with the constituent elements shown in FIG. 3 integrated on a chip. The external resistors 16 and 17, the light receiving element 18, the capacitor 19, the sensing resistor 20, the transformer 21, the rectifying diode 22, the smoothing capacitor 23, the light emitting element 25, the rectifying diode 26 and the smoothing capacitor 27 are discrete elements disposed outside the power supply control device 1.

The power supply control device 1 includes a pulse-width modulation (PWM) controller 2, a pull-up resistor 3, a voltage divider 4, a PWM comparator 5, a flip-flop 6, a driver 7, a switching element 8, an overcurrent protection (OCP) comparator 9, an overvoltage protection (OVP) comparator 10, a short-circuitry detection comparator 11, a current detection resistor 12, a switching transistor 13 and a threshold voltage corrector 14. Moreover, the switching element 8 may be mounted outside the power supply control device.

The power supply control device 1 further includes external terminals for establishing external electrical connections, that is, a virtual circuit connection (VCC) terminal, a drain terminal DRAIN, a source terminal SOURCE, a terminal FB and a terminal ZT.

The transformer 21 includes a primary winding 21A, a secondary winding 21B and an auxiliary winding 21C. One end of the primary winding 21A is connected to an application end of the input voltage VH. The other end of the primary winding 21A is connected to the terminal DRAIN.

One end of the secondary winding 21B is connected to the anode of the rectifying diode 22. The cathode of the rectifying diode 22 and one end of the smoothing capacitor 23 are together connected to an output terminal T1. The other end of the secondary winding 21B and the other end of the smoothing capacitor 23 are together connected to a ground terminal T2. The ground terminal T2 is connected to an application end of a ground potential. The output voltage VOUT is generated at the output terminal T1.

The feedback circuit 24 and the light emitting element 25 are disposed on the secondary side. The feedback circuit 24 drives the light emitting element 25 by a current corresponding to a difference between the output voltage VOUT and a target voltage thereof. The light emitting element 25 and the light receiving element 18 form an optocoupler. The terminal FB is externally connected to the light receiving element 18 and the capacitor 19. The terminal FB is further connected to one end of the pull-up resistor 3 in the power supply control device 1. The other end of the pull-up resistor 3 is connected to an application end of an internal power supply voltage. A terminal FB voltage corresponding to a current flowing in the pull-up resistor 3 and the light receiving element 18 is generated by way of receiving light output from the light emitting element 25 by the light receiving element 18. Thus, a terminal FB voltage corresponding to the difference is generated.

The terminal FB voltage is divided by the voltage divider 4 and is set as a feedback voltage Vfb. The feedback voltage Vfb is applied to an inverting input terminal (−) of the PWM comparator 5.

The switching element 8 is composed of an NMOS transistor. The drain (current inflow end) of the switching element 8 is connected to the terminal DRAIN. The source (current outflow end) of the switching element 8 is connected to the terminal SOURCE. The terminal SOURCE is further externally connected to one end of the sensing resistor 20. The other end of the sensing resistor 20 is connected to an application end of the ground potential. The sensing resistor 20 performs IN conversion on the primary side current Ip flowing in the primary winding 21A and the switching element 8 to further set as the current sensing signal Vcs. The current sensing signal Vcs is applied to a non-inverting input terminal (+) of the PWM comparator 5.

The PWM controller 2 sends signals to a set terminal (S) and a reset terminal (R) of the flip-flop 6 to control the flip-flop 6. More specifically, the PWM controller 2 determines a turn-on timing (off time) of the switching element 8 by sending a signal synchronous with a clock signal of a fixed frequency output from the oscillator (not shown). Moreover, if the PWM comparator 5 detects that the current sensing signal Vcs exceeds the feedback voltage Vfb, the PWM controller 2 sends a signal to be reset to the reset terminal to determine a turn-off timing (on time) of the switching element 8.

A Q output signal output from a Q output terminal of the flip-flop 6 is input to the driver 7. The driver 7 generates a gate signal Vg having a level corresponding to a level of the Q output signal, and applies the gate signal Vg to the gate of the switching element 8. More specifically, the gate signal Vg is high when the Q output signal is high, and the gate signal Vg is low when the Q output signal is low. The switching element 8 is in an on state when the gate signal Vg is high, and the switching element 8 is in an off state when the gate signal Vg is low. Thus, switching control (on/off control) for the switching element 8 is performed by means of PWM control to further control the output voltage VOUT.

3. Auxiliary Winding

One end of the auxiliary winding 21C is connected to an application end of the ground potential. The other end of the auxiliary winding 21C is connected to the anode of the rectifying diode 26. The cathode of the rectifying diode 26 is connected to one end of the smoothing capacitor 27. The other end of the smoothing capacitor 27 is connected to an application end of the ground potential. An auxiliary winding voltage VD generated in the auxiliary winding 21C becomes a pulse voltage through the switching control of the switching element 8, is rectified by the rectifying diode 26, and is smoothed by the smoothing capacitor 27 to generate a power supply voltage Vcc. The power supply voltage Vcc generated is applied to the terminal VCC to become a power supply voltage of the power supply control device 1.

4. Terminal ZT

The other end of the auxiliary winding 21C is connected to one end of the external resistor 16. The other end of the external resistor 16 is connected to one end of the external resistor 17 at a node N1. The other end of the external resistor 17 is connected to an application end of the ground potential. That is to say, the other end of the auxiliary winding 21C forms the application end connected to the ground potential by connecting the external resistor 16 to the external resistor 17 in series. The node N1 is externally connected to the terminal ZT.

The terminal ZT is in the power supply control device 1 and the non-inverting input terminal (+) of the OVP comparator 10 are together connected to a non-inverting input terminal (+) of the short-circuitry detection comparator 11.

A reference voltage Ref10 is applied to an inverting input terminal (−) of the OVP comparator 10. An output of the OVP comparator 10 is input to the PWM controller 2. A reference voltage Ref11 is applied to an inverting input terminal (−) of the short-circuitry detection comparator 11. An output of the short-circuitry detection comparator 11 is input to the PWM controller 2.

If the switching element 8 is disconnected, a flyback voltage VOR is generated in the primary winding 21A. The flyback voltage is represented as VOR=(VOUT+VF) (Np/Ns), where VF represents a forward voltage of the rectifying diode 22, Np represents the number of turns of the primary winding, and Ns represents the number of turns of the secondary winding. At this point in time, the auxiliary winding voltage VD=VOR (Nd/Np), where Nd represents the number of turns of the auxiliary winding.

Moreover, a voltage at the terminal ZT becomes a voltage divided from the auxiliary winding voltage VD by the external resistors 16 and 17. As described above, since VD includes information of the output voltage VOUT, an overvoltage of the output voltage VOUT can be detected by comparing the terminal ZT voltage with the reference voltage Ref10 by the OVP comparator 10. Moreover, short-circuitry with the ground potential of the output terminal T1 can be detected by comparing the terminal ZT voltage with the reference voltage Ref11 by the short-circuitry detection comparator 11.

As such, abnormality of the output voltage VOUT can be detected on the primary side via the terminal ZT. In addition, the terminal ZT of this embodiment is not the same as a terminal ZT disposed in a power supply control device of a pseudo-resonant controller type. The terminal ZT disposed in a power supply control device of a pseudo-resonant controller type is a terminal for detecting the zero time of a secondary-side current flowing in a secondary winding. However, the present disclosure may also be applied to a terminal ZT of a power supply control device of a pseudo-resonant controller type.

5. Variable OCP Threshold Voltage Control Function

Next, a variable OCP threshold voltage control function provided in the power supply control device 1 is described below. The OCP threshold voltage Vocp is applied to the inverting input terminal (−) of the OCP comparator 9. The current sensing signal Vcs is applied to a non-inverting input terminal (+) of the OCP comparator 9.

Constituent elements related to the variable OCP threshold voltage control function include the external resistors 16 and 17, the current detection resistor 12, the switching transistor 13, the threshold voltage corrector 14 and the voltage adjustment resistor 15 provided externally.

As described above, the terminal ZT connected to the node N1 connected to the external resistors 16 and 17 is connected to one end of the current detection resistor 12. The other end of the current detection resistor 12 is connected to the drain of the switching transistor 13 composed of an NMOS transistor. The source of the switching transistor 13 is connected to an application end of a ground potential. The gate of the switching transistor 13 is driven by the gate signal Vg. Moreover, the gate of the switching transistor 13 is not limited to being driven by the gate signal Vg, but can be driven by a signal related to the driving of the switching element 8 such as a Q output signal of the flip-flop 6.

Figure 4:
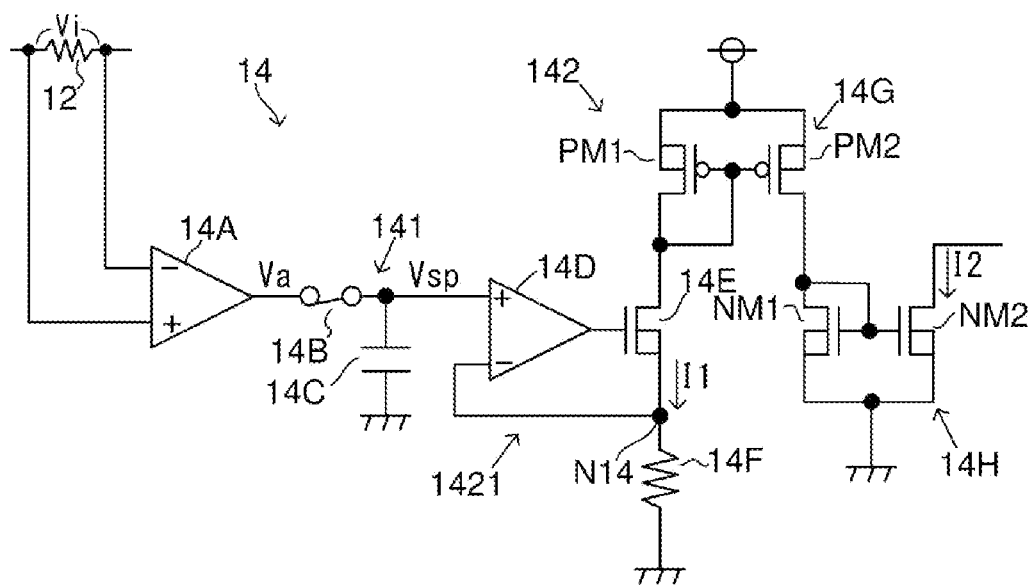
FIG. 4 is a diagram of a configuration example of a threshold voltage corrector.

The threshold voltage corrector 14 corrects the OCP threshold voltage Vocp based on a current detection signal Vi generated in the current detection resistor 12. FIG. 4 shows a diagram of a specific configuration example of the threshold voltage corrector 14.

As shown in FIG. 4, the threshold voltage corrector 14 includes a reverse amplifier 14A, a sample hold unit 141 and a voltage/current (V/I) converter 142. A voltage generated between two ends of the current detection resistor 12, that is, the current detection signal Vi, is input to the reverse amplifier 14A to invert and amplify the input current detection signal Vi. An amplified inverted amplifier output Va is input to the sample hold unit 141.

The sample hold unit 141 has a switch 14B and a capacitor 14C. When the switch 14B is in an on state, the amplifier output Va is directly output as a sample output Vsp. When the switch 14B is in an off state, the capacitor 14C holds the sample output Vsp immediately before the switch 14B is switched from the on state to the off state. The sample output Vsp is input to the V/I converter 142.

The V/I converter 142 includes a constant current generating circuit 1421, a first current mirror 14G and a second current mirror 14H. The constant current generating circuit 1421 includes an error amplifier 14D, an NMOS transistor 14E and a resistor 14F.

The sample output Vsp is input to a non-inverting input terminal (+) of the error amplifier 14D. An output terminal of the error amplifier 14 is connected to the gate of the NMOS transistor 14. The source of the NMOS transistor 14E is connected to one end of the resistor 14F at a node N14. The other end of the resistor 14F is connected to an application end of the ground potential. The node N14 is connected to an inverting input terminal (−) of the error amplifier 14D. Accordingly, the voltage control at the node N14 is controlled to be the sample output Vsp, and a constant current I1 is generated via the voltage at the node N14 and the resistor 14F.

The first current mirror 14G includes a PMOS transistor PM1 on an input side and a PMOS transistor PM2 on an output side. The drain of the PMOS transistor PM1 is connected to the drain of the NMOS transistor 14E. The gate and drain of the PMOS transistor PM1 are short-circuited. Respective sources of the PMOS transistors PM1 and PM2 are both connected to an application end of the internal power supply voltage. The gates of the PMOS transistors PM1 and PM2 are connected to each other.

The second current mirror 14H includes an NMOS transistor NM1 on an input side and an NMOS transistor NM2 on an output side. The drain of the NMOS transistor NM1 is connected to the drain of the PMOS transistor PM2. The gate and drain of the NMOS transistor NM1 are short-circuited. Respective sources of the NMOS transistors NM1 and NM2 are both connected to an application end of the ground potential. The gates of the NMOS transistors NM1 and NM2 are connected to each other.

Accordingly, the constant current I1 generated by the constant current generating circuit 1421 is mirrored by the first current mirror 14G and the second current mirror 14H and is set as an output current I2. As such, the V/I converter 142 performs V/I conversion on the sample output Vsp to the output current I2.

Moreover, as shown in FIG. 3, one end of the voltage adjustment resistor 15 is connected to the inverting input terminal (−) of the OCP comparator 9 at a node N2. The drain of the NMOS transistor NM2 in the second current mirror 14H is connected to the node N2. The other end of the voltage adjustment resistor 15 is connected to an application end of a reference voltage Ref9. The output current I2 generated by the threshold voltage corrector 14 flows through the voltage adjustment resistor 15, and a voltage is generated from stepping down the reference voltage Ref9 by the voltage adjustment resistor 15 at the node N2 and used as the OCP threshold voltage Vocp. As such, the threshold voltage corrector 14 generates the output current I2 based on a current detection signal Vi generated in the current detection resistor 12 to accordingly correct the OCP threshold voltage Vocp.

Figure 5:
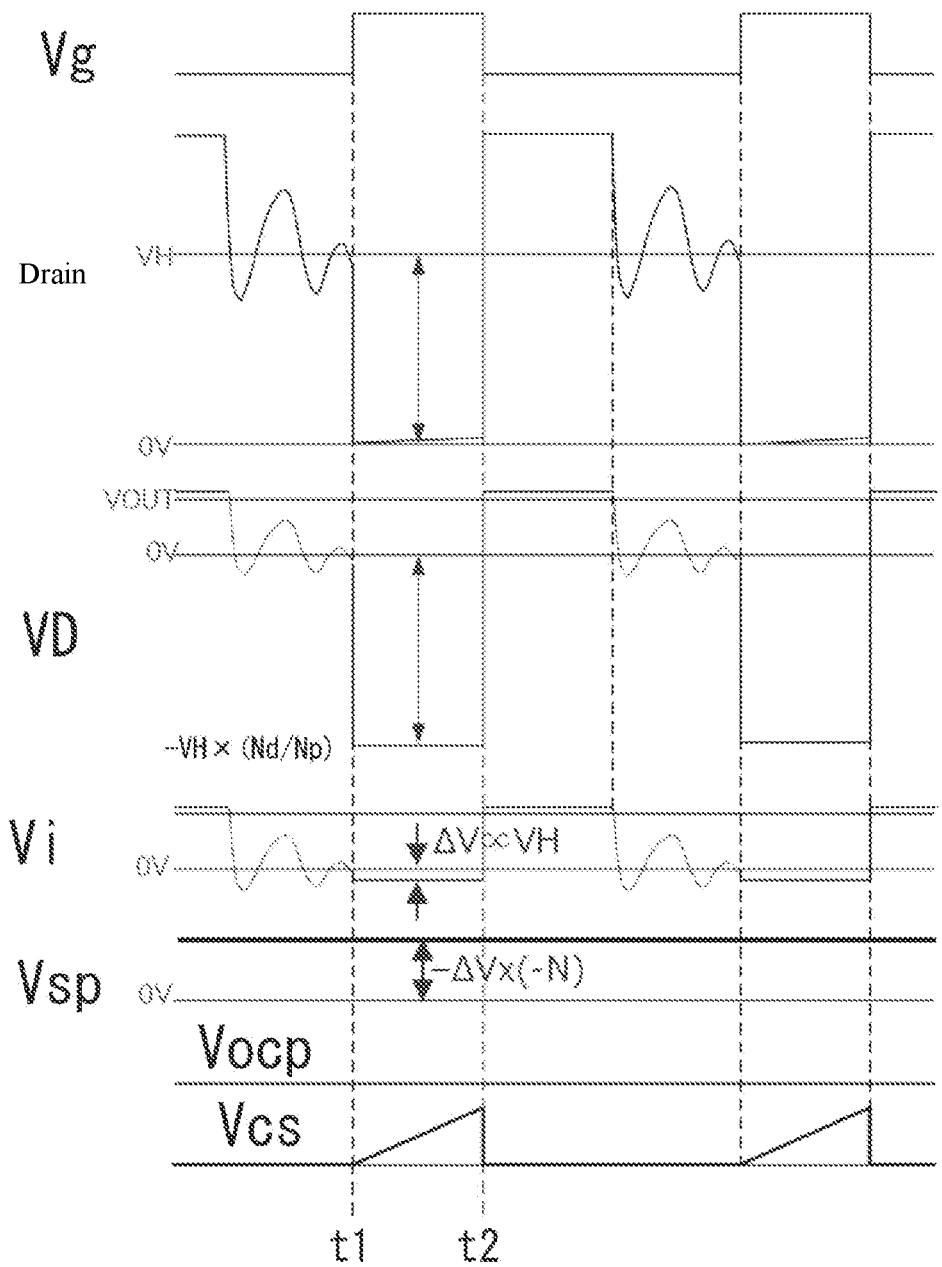
FIG. 5 is a timing diagram of exemplary waveforms of various signals in a flyback converter.

FIG. 5 shows a timing diagram of exemplary waveforms of various signals in the flyback converter 28. In FIG. 5, waveforms of the gate signal Vg, the terminal DRAIN voltage, the auxiliary winding voltage VD, the current detection signal Vi, the sample output Vsp, the OCP threshold voltage Vocp and the current sensing signal Vcs are depicted sequentially from top to bottom.

At an instant t1 in FIG. 5, the switching element 8 is turned on if the gate signal Vg rises to high. Accordingly, the terminal DRAIN voltage drops to 0 V, and the current sensing signal Vcs starts rising. At this point in time, the auxiliary winding voltage drops to $VD=-VH\times(Nd/Np)$. Moreover, since the switching transistor 13 is set to an on state by the gate signal Vg, a terminal current Izt flows from the application end of the ground potential through the switching transistor 13, the terminal ZT and the external resistor 16 to a side of an application end of VD, as shown in FIG. 3.

At this point in time, the current detection signal Vi corresponding to the terminal current Izt is generated via the current detection resistor 12 to detect the terminal current Izt. Herein, as shown in FIG. 5, $Vi=-\Delta V$. VD includes information of the input voltage VH, and so $\Delta V$ is proportional to the input voltage VH.

The negative voltage, that is, Vi, is input to the reverse amplifier 14A (FIG. 4) so as to be inverted and amplified. If the amplification ratio is set to N, the amplifier output $Va=Vi\times(-N)=-\Delta V\times(-N)$. When the gate signal Vg is high, the switch 14B in the sample hold unit 141 is switched from an off state to an on state, and samples the amplifier output Va to generate the sample output Vsp. Moreover, when the gate signal Vg is high, the switch 14B is switched from an on state to an off state, and holds the sample output Vsp.

The sample output Vsp is converted to the output current I2 by the V/I converter 142, and flows through the voltage adjustment resistor 15 to accordingly correct the OCP threshold voltage Vocp.

Thus, the OCP threshold voltage Vocp is variable according to the input voltage VH. When the switching element 8 is in an on state, the OCP comparator 9 compares the rising current sensing signal Vcs with the OCP threshold voltage Vocp, and outputs a high signal to the PWM controller 2 when Vcs exceeds Vocp. At this point in time, the PWM controller 2 resets the flip-flop 6 to turn off the switching element 8. A delay occurs from upon detecting that Vcs exceeds Vocp by the OCP comparator 9 till the switching element 8 is turned off. However, since the OCP threshold voltage Vocp is variable according to the input voltage VH, as described in the section regarding the issues, a peak value of Vcs, that is, a difference in a peak value of the primary side current Ip, caused by a change in the input voltage VH at an instant of turning off the switching element 8 can be inhibited.

In addition, in this embodiment, resistance values of the external resistors 16 and 17 provided externally can be adjusted by changing a calculated value of the resistance values without changing the voltage dividing ratio according to the inductance of the primary winding 21A used. For example, the resistance values of the external resistors 16 and 17 are both set from 100 kΩ to 10 kΩ. The terminal current Izt can be adjusted by adjusting the resistance value of the external resistor 16.

Thus, without affecting the overvoltage detection of the OVP comparator 10 using the terminal ZT and the short-circuitry detection of the short-circuitry detection comparator 11, the OCP threshold voltage Vocp can be corrected according to the inductance of the primary winding 21A. Therefore, as described in the section regarding the issues, a peak value of Vcs, that is, a difference in a peak value of the primary side current Ip, caused by a change in the inductance of the primary winding 21A at an instant of turning off the switching element 8 can be inhibited. That is to say, the condition shown on the right of FIG. 2 can be improved.

6. First Variant Example

Figure 6:
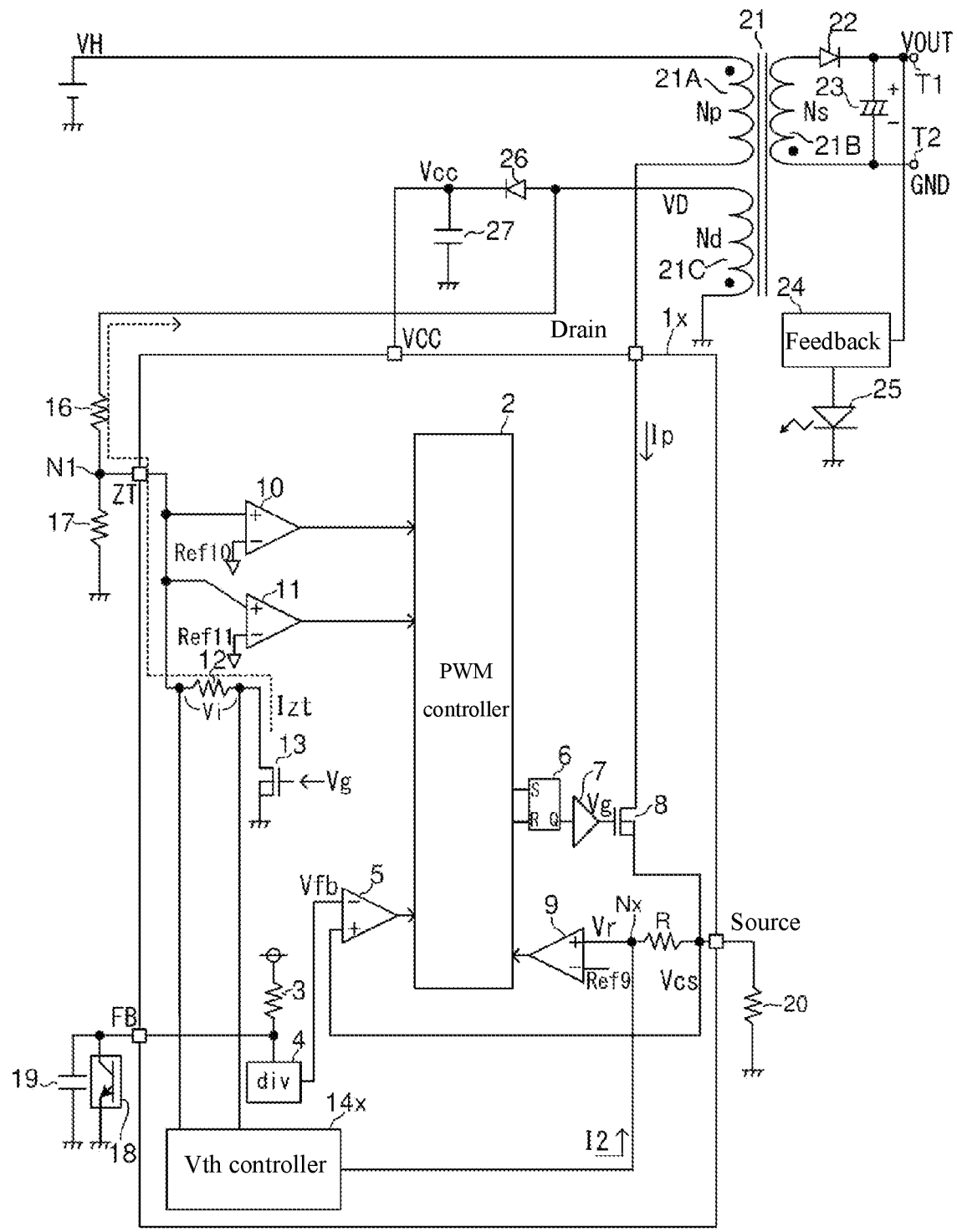
FIG. 6 is a diagram of a configuration of a power supply control device of a first variant example.
Figure 7:
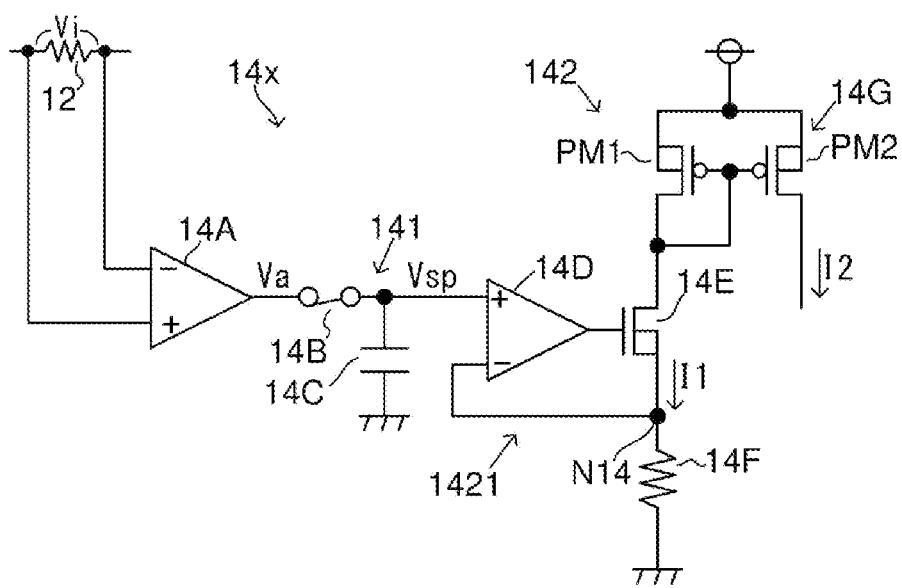
FIG. 7 is a diagram of a configuration of a threshold voltage corrector of a first variant example.

FIG. 6 shows a diagram of a configuration of a power supply control device 1x of a first variant example. Differences in the configuration of the power supply control device 1x in FIG. 6 from that of the embodiment above (FIG. 3) are described below. FIG. 7 shows a diagram of a configuration of a threshold voltage corrector 14x included in the power supply control device 1x. As shown in FIG. 7, the configuration of the threshold voltage corrector 14x differs from the threshold voltage corrector 14 (FIG. 4) of the embodiment above by excluding a current mirror of an NMOS transistor at a rear end. As shown in FIG. 6, an inserting resistor R is inserted between the non-inverting input terminal (+) of the OCP comparator 9 and the terminal SOURCE (that is, one end of the sensing resistor 20). The drain of the PMOS transistor PM2 of the current mirror 14G (FIG. 7) is connected to a node Nx connected to the non-inverting input terminal (+) of the OCP comparator 9 and one end (an end on the opposite side to the terminal SOURCE) of the inserting resistor R. That is to say, one end of the resistor including the sensing resistor 20 and the inserting resistor R is connected to the non-inverting input terminal (+) of the OCP comparator 9. Moreover, the reference voltage Ref9 is applied to the inverting input terminal (−) of the OCP comparator 9.

With the configuration above, the output current I2 generated and output by the current mirror 14G flows to the node Nx (FIG. 6), as shown in FIG. 7. The output current I2 flows from the node Nx through the inserting resistor R and the sensing resistor 20. On the other hand, the primary side current Ip flows through the sensing resistor 20. That is to say, although a sink-type configuration that sucks the output current I2 is used in the embodiment above (FIG. 3), a source-type configuration that discharges the output current I2 in this embodiment may also be used. The OCP comparator 9 compares a voltage Vr generated at the node Nx via the inserting resistor R and the sensing resistor 20 with the reference voltage Ref9.

Even in the configuration of in this embodiment, the OCP threshold voltage compared with the current sensing signal Vcs obtained by IN conversion of the primary side current Ip can be substantially corrected based on the current detection signal Vi.

In particular, because the resistance value of the sensing resistor 20 is extremely small in most cases, a current in several hundreds of mA needs to be flowed into the sensing resistor 20 in order to generate a voltage. Thus, in the configuration in FIG. 6, the inserting resistor R having a larger resistance value is provided, so that a voltage can be generated even for a smaller current to thereby reduce power consumption. Moreover, the inserting resistor R is optional.

7. Second Variant Example

Figure 8:
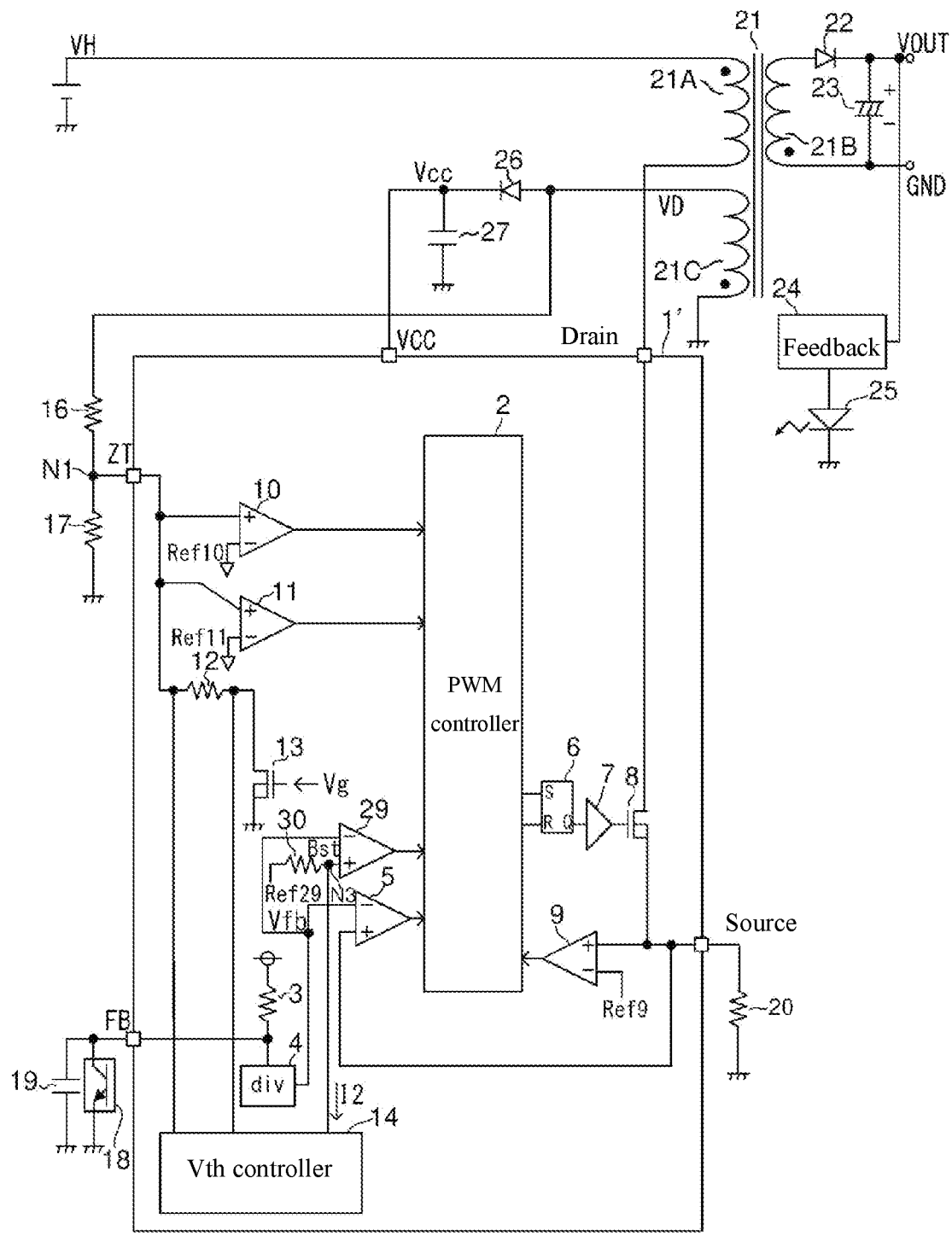
FIG. 8 is a diagram of a configuration of a flyback converter of a second variant example.

FIG. 8 shows a diagram of a configuration of a flyback converter 28' of a second variant example. The configuration of a power supply control device 1' included in the flyback converter 28' differs from the embodiments by including a burst comparator 29.

The feedback voltage Vfb is applied to an inverting input terminal (−) of the burst comparator 29. A non-inverting input terminal (+) of the burst comparator 29 and one end of the voltage adjustment resistor 30 are connected at a node N3. The other end of the voltage adjustment resistor 30 is connected to an application end of a reference voltage Ref29.

Figure 9:
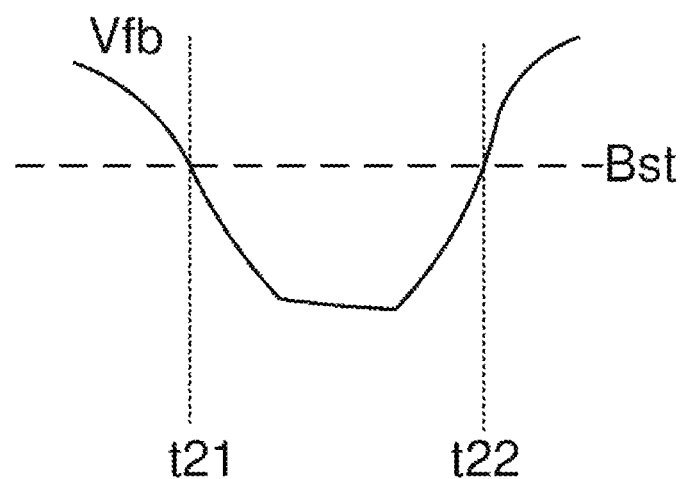
FIG. 9 is a diagram of exemplary waveforms of a feedback voltage and a burst threshold voltage.

A burst threshold voltage Bst is generated at the node N3. As shown in FIG. 9, the feedback voltage Vfb drops if the load is a light load. If the feedback voltage Vfb is lower than the burst threshold voltage Bst (at an instant t21 in FIG. 9), an output signal of the burst comparator 29 is high. Accordingly, the PWM controller 2 halts switching of the switching element 8 (maintaining an off state). Moreover, if the feedback voltage Vfb rises as the switching is halted and the feedback voltage Vfb exceeds the burst threshold voltage Bst (at an instant t22), the output signal of the burst comparator 29 is low. Accordingly, the PWM controller 2 starts switching of the switching element 8 (resuming from the switching halt). Switching loss during a light load can be reduced with the burst function above.

In the burst operation above, to resume from the switching halt, the switching element 8 is turned on and the current sensing signal Vcs (the primary side current Ip) rises, and the PWM controller 2 turns off the switching element 8 once the PWM comparator 5 detects that the feedback voltage Vfb is exceeded. The feedback voltage Vfb equal to the burst threshold voltage Bst is used as a threshold voltage to be compared with the current sensing signal Vcs in order to resume from the switching halt, a time delay exists from upon detecting that Vcs exceeds Bst till the switching element 8 is turned off. Thus, an issue the same as the OCP is generated.

Thus, in this variant example, as shown in FIG. 8, the output current I2 generated by the threshold voltage corrector 14 flows through the voltage adjustment resistor 30, and a voltage is generated from stepping down the reference voltage Ref29 by the voltage adjustment resistor 30 and is used as the burst threshold voltage Bst. In this case, the drain of the NMOS transistor NM2 (FIG. 4) of the second current mirror 14H in the threshold voltage corrector 14 is connected to the node N3.

Accordingly, the burst threshold voltage Bst can be corrected according to the input voltage VH and the change in the inductance of the primary winding 21A. Thus, a difference produced in the peak value of the primary side current Ip when resuming from the switching halt is to be performed in the burst operation can be inhibited.

Moreover, the correction of the threshold voltage corrector can also be applied to both the OCP threshold voltage and the burst threshold voltage.

8. Other

Embodiments of the present disclosure are described above; however, various modifications may be made to the embodiments without departing from the scope of the subject matter of the present disclosure.

For example, the rectifying element on the secondary side is not limited to the rectifying diode 22 in FIG. 3, FIG. 6 and FIG. 8, and a rectifying diode having a cathode connected to the other end of the secondary winding 21B and an anode connected to a ground terminal may also be used.

Figure 10:
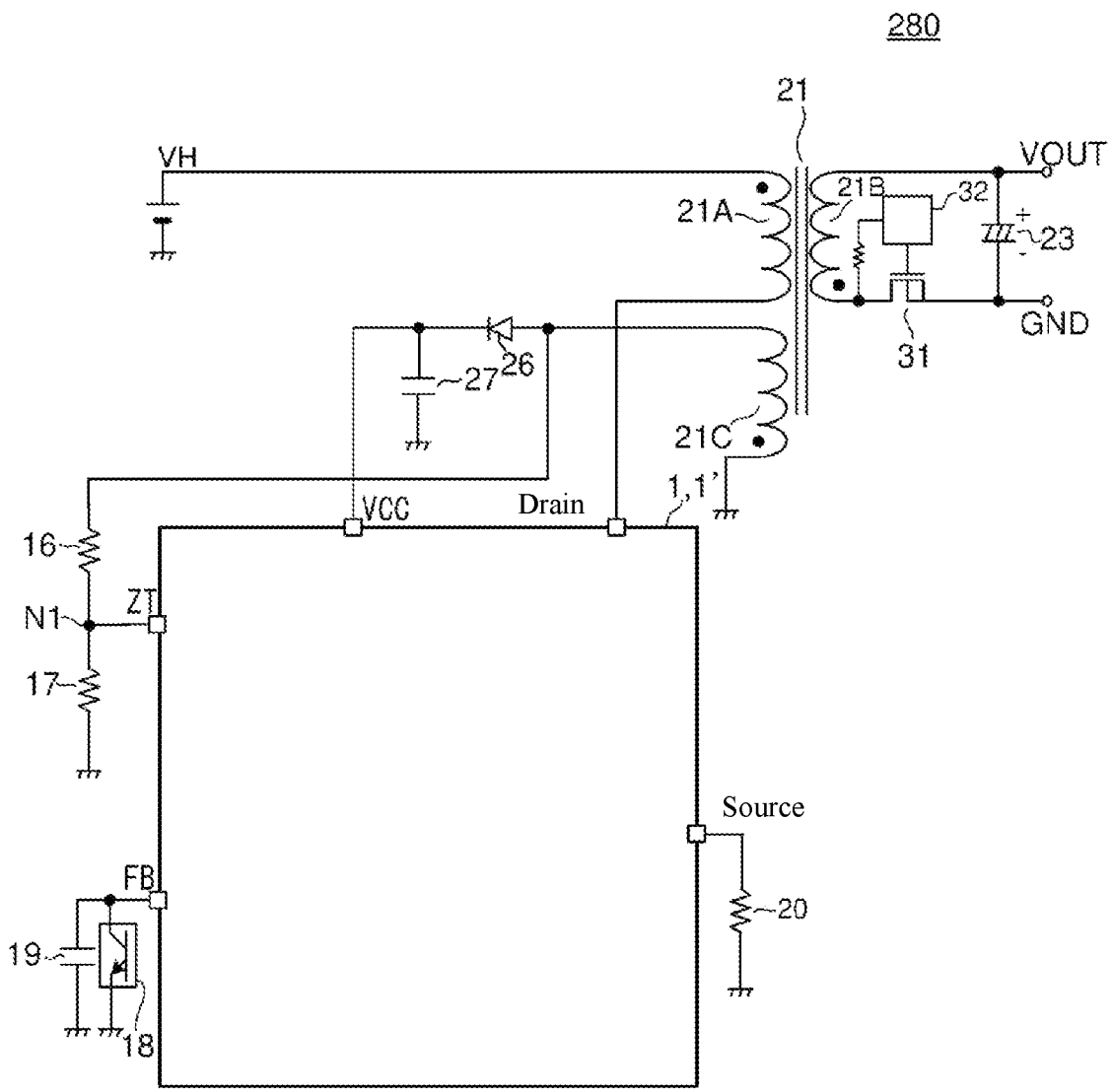
FIG. 10 is a diagram of a configuration of a flyback converter of another variant example.

Alternatively, as in a flyback converter 280 shown in FIG. 10, a synchronous rectifying transistor 31 may also be used as a rectifying element on the secondary side. In this case, a synchronous rectification controller 32 is disposed together with the synchronous rectifying transistor 31 on the secondary side. The synchronous rectification controller 32 is synchronous with switching of a switching element (although not shown in FIG. 10, similar to the switching element 8 in FIG. 3, FIG. 6 and FIG. 8) on the primary side, and switches the synchronous rectifying transistor 31.

INDUSTRIAL APPLICABILITY

The present disclosure is applicable to, for example, an isolated AC/DC converter or an isolated DC/DC converter.

The invention claimed is:

1. A power supply control device, used for a flyback converter, the flyback converter comprising:
   a switching element;
   a transformer, including a primary winding, a secondary winding, and an auxiliary winding;
   a rectifying element; and
   a smoothing capacitor, wherein
   an application end of an input voltage is connected to one end of the primary winding,
   a current inflow end of the switching element is connected to another end of the primary winding, and
   the rectifying element and the smoothing capacitor are disposed on a rear side of the secondary winding,
   wherein the power supply control device comprises:
      a comparator, comparing a current sensing signal generated by I/V conversion of a primary side current flowing in the primary winding with a threshold voltage;
      a switching controller, turning off the switching element according to a comparing result of the current sensing signal and the threshold voltage by the comparator;
      an external terminal, connectable to a connection node of an external resistor connected in series between one end of the auxiliary winding and an application end of a ground potential;
      a current detector, detecting a terminal current flowing through the external terminal; and
      a threshold voltage corrector, correcting the threshold voltage based on a current detection signal of the current detector.

2. The power supply control device of claim 1, wherein the current detector is a current detection resistor.

3. The power supply control device of claim 2, wherein the threshold voltage corrector includes a reverse amplifier that inverts and amplifies the current detection signal.

4. The power supply control device of claim 1, wherein the threshold voltage corrector includes a sample hold unit that samples a voltage based on the current detection signal.

5. The power supply control device of claim 2, wherein the threshold voltage corrector includes a sample hold unit that samples a voltage based on the current detection signal.

6. The power supply control device of claim 1, further comprising a voltage adjustment resistor connected between an input terminal of the comparator and an application end of a reference voltage, wherein
   the threshold voltage corrector generates an output current based on the current detection signal, and
   the output current flows through the voltage adjustment resistor and is sucked into one side of the threshold voltage corrector.

7. The power supply control device of claim 2, further comprising a voltage adjustment resistor connected between an input terminal of the comparator and an application end of a reference voltage, wherein
the threshold voltage corrector generates an output current based on the current detection signal, and
the output current flows through the voltage adjustment resistor and is sucked into one side of the threshold voltage corrector.

8. The power supply control device of claim 6, wherein the threshold voltage corrector includes a constant current generating circuit in which a voltage based on the current detection signal is inputted to generate a constant current, and the output current is generated based on the constant current.

9. The power supply control device of claim 7, wherein the threshold voltage corrector includes a constant current generating circuit in which a voltage based on the current detection signal is inputted to generate a constant current, and the output current is generated based on the constant current.

10. The power supply control device of claim 8, wherein the threshold voltage corrector includes:
a first current mirror, having an input end connected to an output end of the constant current generating circuit, wherein the first current mirror is composed of a PMOS transistor; and
a second current mirror, having an input end connected to an output end of the first current mirror, wherein second current mirror is composed of an NMOS transistor.

11. The power supply control device of claim 9, wherein the threshold voltage corrector includes:
a first current mirror, having an input end connected to an output end of the constant current generating circuit, wherein the first current mirror is composed of a PMOS transistor; and
a second current mirror, having an input end connected to an output end of the first current mirror, wherein second current mirror is composed of an NMOS transistor.

12. The power supply control device of claim 1, wherein
an input terminal of the comparator is connected to an application end of a reference voltage,
another input terminal of the comparator is connected to an end of a resistor including a sensing resistor having one end connected to a current outflow end of the switching element,
the threshold voltage corrector generates an output current based on the current detection signal, and
the output current is discharged toward a node to which the another input terminal of the comparator and the end of the resistor are connected.

13. The power supply control device of claim 2, wherein
an input terminal of the comparator is connected to an application end of a reference voltage,
another input terminal of the comparator is connected to an end of a resistor including a sensing resistor having one end connected to a current outflow end of the switching element,
the threshold voltage corrector generates an output current based on the current detection signal, and
the output current is discharged toward a node to which the another input terminal of the comparator and the end of the resistor are connected.

14. The power supply control device of claim 12, further comprising an inserting resistor inserted between the another input terminal of the comparator and the end of the resistor including the sensing resistor.

15. The power supply control device of claim 13, further comprising an inserting resistor inserted between the another input terminal of the comparator and the end of the resistor including the sensing resistor.

16. The power supply control device of claim 1, further comprising a switch disposed in a path through which the terminal current flows, and controlled to be on/off based on a signal related to a drive of the switching element.

17. The power supply control device of claim 1, wherein the threshold voltage is an OCP (overcurrent protection) threshold voltage.

18. The power supply control device of claim 1, further comprising:
a first comparator, comparing a feedback voltage based on an output voltage of the flyback converter with a burst threshold voltage; and
a second comparator, used as a comparison unit for comparing the feedback voltage and the current sensing signal, wherein
the switching controller switches between halt and resumption of a switching of the switching element according to an output of the first comparator, and
the threshold voltage is the burst threshold voltage.

19. A flyback converter, comprising:
the power supply control device of claim 1;
the switching element;
the transformer;
the rectifying element;
the smoothing capacitor; and
the external resistor.

20. A flyback converter, comprising:
the power supply control device of claim 2;
the switching element;
the transformer;
the rectifying element;
the smoothing capacitor; and
the external resistor.

* * * * *